United States Patent
Murayama

(10) Patent No.: US 7,611,785 B2
(45) Date of Patent: Nov. 3, 2009

(54) GENERATION METHOD WITH FUEL CELL GENERATION SYSTEM AND FUEL CELL GENERATION SYSTEM

(75) Inventor: Kunihiko Murayama, Tokyo (JP)

(73) Assignee: Ebara Corporation, Tokyo (JP)

( * ) Notice: Subject to any disclaimer, the term of this patent is extended or adjusted under 35 U.S.C. 154(b) by 777 days.

(21) Appl. No.: 10/492,855

(22) PCT Filed: Oct. 15, 2002

(86) PCT No.: PCT/JP02/10684

§ 371 (c)(1),
(2), (4) Date: Oct. 27, 2004

(87) PCT Pub. No.: WO03/034528

PCT Pub. Date: Apr. 24, 2003

(65) Prior Publication Data

US 2005/0042485 A1 Feb. 24, 2005

(30) Foreign Application Priority Data

Oct. 18, 2001 (JP) .............................. 2001-320984

(51) Int. Cl.
*H01M 8/04* (2006.01)
(52) U.S. Cl. .......................................... 429/23; 429/25
(58) Field of Classification Search .................. 429/13, 429/22, 23, 25, 30
See application file for complete search history.

(56) References Cited

U.S. PATENT DOCUMENTS 5,366,821 A * 11/1994 Merritt et al. ............... 429/21

FOREIGN PATENT DOCUMENTS

| JP | 6-20713 | | 1/1994 |
|---|---|---|---|
| JP | 6-20713 A | | 1/1994 |
| JP | 07-263008 | | 10/1995 |
| JP | 8-96825 A | | 4/1996 |
| JP | 2001-143732 | * | 5/2001 |
| JP | 2001-143732 A | | 5/2001 |
| JP | 2001-266918 A | | 9/2001 |

* cited by examiner

*Primary Examiner*—Patrick Ryan
*Assistant Examiner*—Thomas H. Parsons
(74) *Attorney, Agent, or Firm*—Foley & Lardner LLP

(57) ABSTRACT

A generation method using a fuel cell generation system, comprising the steps of: supplying a fuel gas 14a to a fuel electrode 21 through fuel gas passages 14 at a low pressure, supplying an oxidizer gas 15a to an oxidizer electrode 22 at a low pressure, generating electricity by causing electrochemical reaction between the fuel gas 14a and the oxidizer gas 15a supplied, and controlling the fuel utilization ratio on the fuel electrode 21 so as to prevent the fuel gas passages 14 from being clogged with condensed water. Decrease in performance and local deterioration of materials are less likely to occur while component devices are not required of wide turn-down ratios.

8 Claims, 7 Drawing Sheets

GENERATION METHOD WITH FUEL CELL GENERATION SYSTEM AND FUEL CELL GENERATION SYSTEM

TECHNICAL FIELD

This invention relates to a generation method by means of a fuel cell generation system and to the fuel cell generation system itself, and in particular to a generation method using a fuel cell generation system that is less likely to invite decrease in performance and local deterioration of materials and that does not require a wide range of turn-down ratio for component devices, and to the fuel cell generation system itself.

BACKGROUND ART

As for fuel cell generation systems of small sizes, or of the class of several kW or less for the household use or the like, most systems are of a normal pressure working type in which gas is supplied at normal to low pressures from the viewpoint of safety or with the intention of improving efficiency by reducing power for auxiliary components. Many of such systems use fuel cells of the solid polymer type in view of a possibility of cost reduction on one hand and the fact that the working range is low in temperature (60 to 80 degrees C.) on the other.

In the solid polymer type fuel cell generation system, direct current power is generated as a fuel gas such as hydrogen and an oxidizer gas such as air are supplied to a fuel electrode and an oxidizer electrode of a fuel cell, respectively, and both gasses react electrochemically between both electrodes. The ratio of the amount of gas actually consumed for the reaction to the amount of gas supplied is called the utilization ratio. A low utilization ratio means that a large amount of gas is wasted and that the generation efficiency of the system is low. Too high a utilization ratio poses the risk of causing deterioration of cell constituting materials. Therefore, the utilization ratios are controlled to appropriate values for both fuel and oxidizer.

In the conventional fuel cell generation system, the utilization ratio is controlled to be constant as shown in FIG. 9. In other words, the amounts of fuel and oxidizer supplied are controlled to be in the following relation:

Supplied fuel gas flow rate=Consumed fuel gas amount÷Preset fuel utilization ratio (constant value)

Supplied oxidizer gas flow rate=Consumed oxidizer gas amount÷Preset oxidizer gas utilization ratio (constant value)

Here, the supplied fuel gas flow rate or the supplied oxidizer gas flow rate is related to the DC load current as shown in FIG. 10.

With the conventional fuel cell generation system described above, however, decrease in performance or local deterioration of materials occasionally occurs, in particular when gases are supplied at low pressures or the fuel cell is operated at an output that is lower than the designed rated operating point.

Another problem is that component devices, for operation at low outputs, are required of a wide range of turn-down ratio, which inevitably invites increase in cost. Because of the above, with the solid polymer type fuel cell generation system for the low pressure operation, the turn-down ratio at a low load has been restricted and the operating range has been small.

Therefore, the object of this invention is to provide a generation method using a fuel cell generation system that is less likely to invite decrease in performance or local deterioration of materials and that does not require a wide turn-down ratio for component devices, and the fuel cell generation system itself.

DISCLOSURE OF INVENTION

An object of this invention is to provide a generation method using a fuel cell generation system, as shown for example in FIG. 3, having a solid polymer membrane 11a forming an electrolyte, having a fuel electrode 21 and fuel gas passages 14 for supplying to the fuel electrode 21 a fuel gas 14a containing hydrogen as a main component on one side of the solid polymer membrane 11a, and having an oxidizer electrode 22 on the other side of the solid polymer membrane 11a, the method comprising the steps of: supplying the fuel gas 14a to the fuel electrode 21 through the fuel gas passages 14 at a low pressure; supplying an oxidizer gas 15a to the oxidizer electrode 22 at a low pressure; generating electricity by causing electrochemical reaction between the fuel gas 14a and the oxidizer gas 15a supplied; and controlling the fuel utilization ratio on the fuel electrode 21 so as to prevent the fuel gas passages 14 from being clogged with condensed water.

Here, the oxidizer gas is typically air, and controlling so as to prevent the fuel gas passages from being clogged with condensed water is typically controlling such that the fuel utilization ratio in the low output operation is lower than that in the rated operation.

With the above constitution, since the fuel gas composed mainly of hydrogen is supplied through the fuel gas passages to the fuel electrode at a low pressure and the oxidizer gas is supplied to the oxidizer electrode at a low pressure, the system is easy to use even in household for example, and electricity is generated as the generation is carried out by causing electrochemical reaction between the fuel gas and the oxidizer gas supplied. Since the fuel utilization ratio on the fuel electrode is controlled so as to prevent the fuel gas passages from being clogged with condensed water, it is possible to prevent the performance of the fuel cell generation system from lowering and to prevent materials from locally deteriorating. Here, the low pressure is typically 0.1 Mpa or less, for both fuel gas and oxidizer gas.

Another object of this invention is to provide a generation method using a fuel cell generation system, as shown for example in FIG. 3, having a solid polymer membrane 11a forming an electrolyte, having a fuel electrode 21 on one side of the solid polymer membrane 11a, and having an oxidizer electrode 22 and oxidizer gas passages 15 for supplying an oxidizer gas 15a to the oxidizer electrode 22 on the other side of the solid polymer membrane 11a, the method comprising the steps of: supplying a fuel gas 14a containing hydrogen as a main component to the fuel electrode 21 at a low pressure; supplying the oxidizer gas 15a to the oxidizer electrode 22 through the oxidizer gas passages 15 at a low pressure; generating electricity by causing electrochemical reaction between the fuel gas 14a and the oxidizer gas 15a supplied; and controlling the oxidizer utilization ratio on the oxidizer electrode 22 so as to prevent the oxidizer gas passages 15 from being clogged with condensed water.

Controlling so as to prevent the oxidizer gas passages from being clogged with condensed water is typically controlling such that the oxidizer utilization ratio at a low load is lower than that in the rated operation.

It is further preferable that: fuel gas passages are provided to supply a fuel gas composed mainly of hydrogen to the fuel electrode, oxidizer gas passages are provided to supply an oxidizer gas to the oxidizer electrode, the fuel utilization ratio in the fuel gas passages is controlled so as not to block the fuel gas passages, and the oxidizer gas utilization ratio in the oxidizer gas passages is controlled so as not to block the oxidizer gas passages.

Still another object of this invention is to provide a fuel cell generation system, as shown for example in FIGS. 1 and 3, comprising: a solid polymer membrane 11a forming an electrolyte; a fuel electrode 21 provided on one side of the solid polymer membrane 11a; fuel gas passages 14 provided adjacent to the fuel electrode 21 to supply a fuel gas 14a containing hydrogen as a main component to the fuel electrode 21 at a low pressure; an oxidizer electrode 22 provided on the other side of the solid polymer membrane 11a to be supplied with an oxidizer gas 15a at a low pressure; and a controller 53 for controlling the fuel utilization ratio on the fuel electrode 21 so that the fuel gas passages 15 are not clogged with water, wherein electricity is generated by causing electrochemical reaction between the fuel gas 14a and the oxidizer gas 15a supplied.

Still another object of this invention is to provide a fuel cell generation system, as shown for example in FIGS. 1 and 3, comprising: a solid polymer membrane 11a forming an electrolyte; a fuel electrode 21 provided on one side of the solid polymer membrane 11a to be supplied with a fuel gas 14a containing hydrogen as a main component at a low pressure; an oxidizer electrode 22 provided on the other side of the solid polymer membrane 11a; oxidizer gas passages 15 provided adjacent to the oxidizer electrode 22 to supply an oxidizer gas 15a to the oxidizer electrode 22 at a low pressure; and a controller 54 for controlling the oxidizer utilization ratio on the oxidizer electrode 22 so that the oxidizer passages 15 are not clogged with water, wherein electricity is generated by causing electrochemical reaction between the fuel gas 14a and the oxidizer gas 15a supplied.

The basic Japanese Patent Application No. 2001-320984 filed on Oct. 18, 2001 is hereby incorporated in its entirety by reference into the present application.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

BEST MODE FOR CARRYING OUT THE INVENTION

Figure 1:
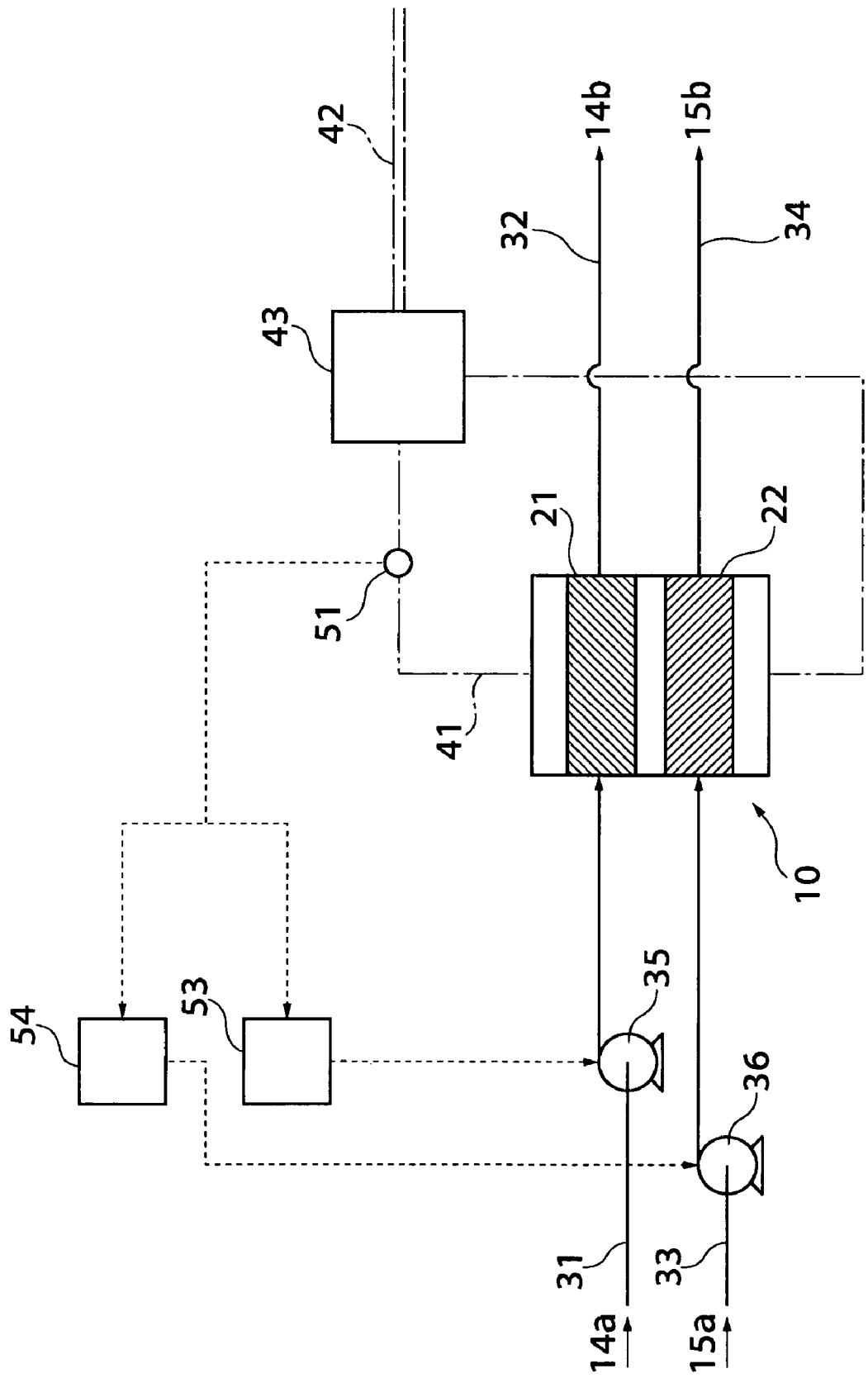
FIG. 1 is a flowchart of a fuel cell generation system as a first embodiment.

Embodiments of this invention are described below in reference to the appended drawings. Incidentally, the same or corresponding parts in the drawings are provided with the same or similar symbols and redundant description is omitted.

Figure 2:
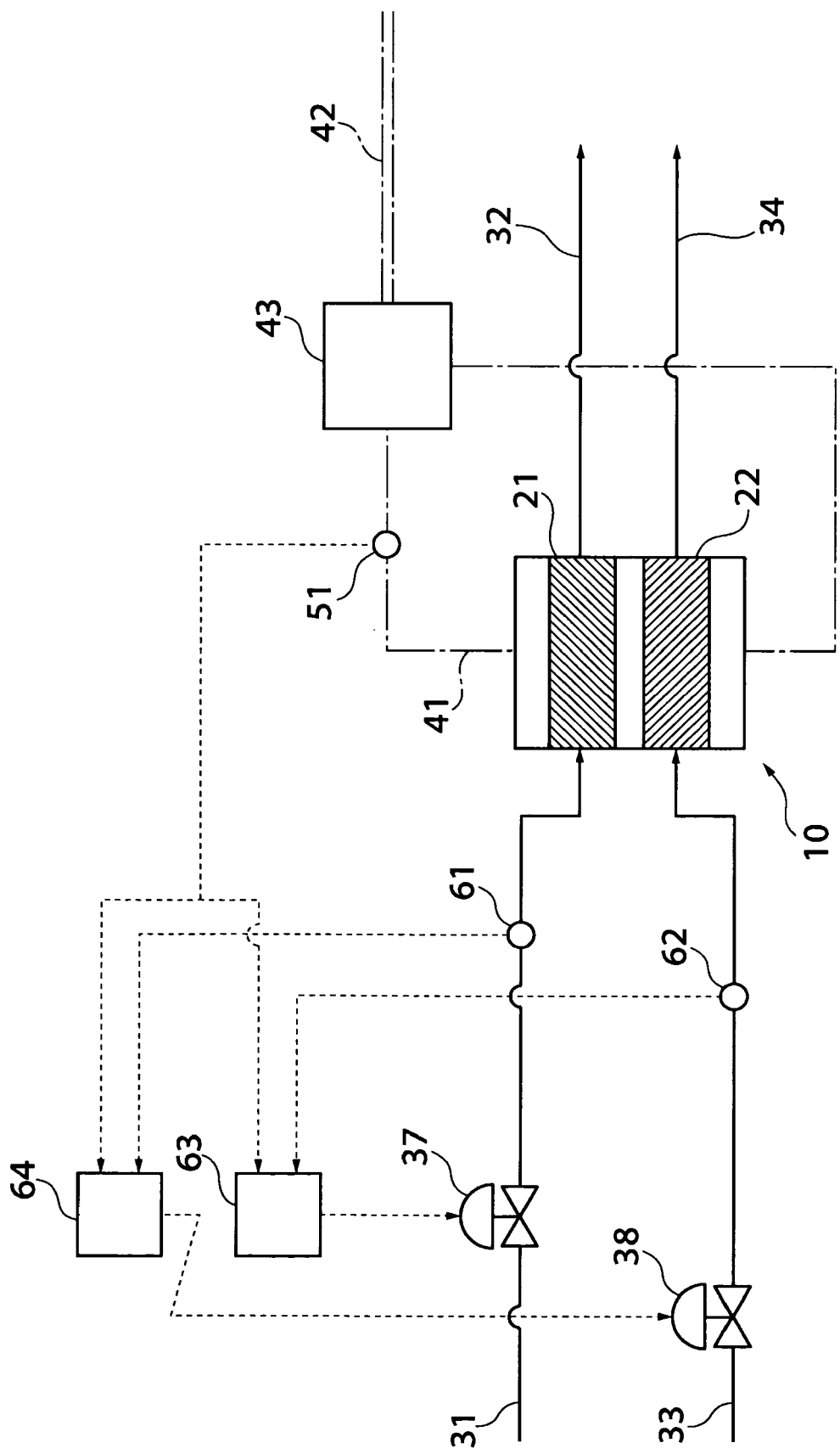
FIG. 2 is a flowchart of the fuel cell generation system as a second embodiment.

Before describing a fuel cell system according to a first embodiment of this invention in reference to the flowcharts shown in FIGS. 1 and 2, the basic constitution of a fuel cell stack used in embodiments of this invention is described in reference to perspective and sectional views shown in FIG. 3.

Figure 3A:
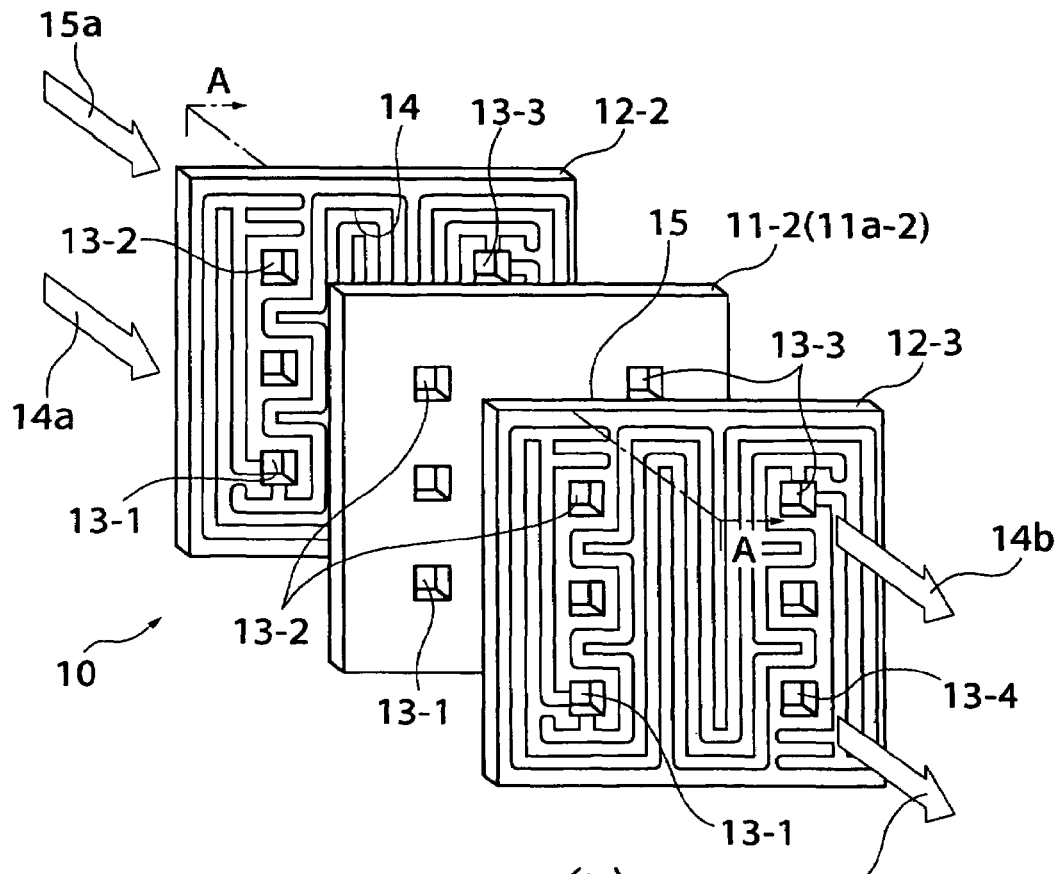
FIGS. 3(a) and 3(b) are a perspective view and a sectional view, showing the basic constitution of a fuel cell stack used in embodiments of this invention.
Figure 3B:
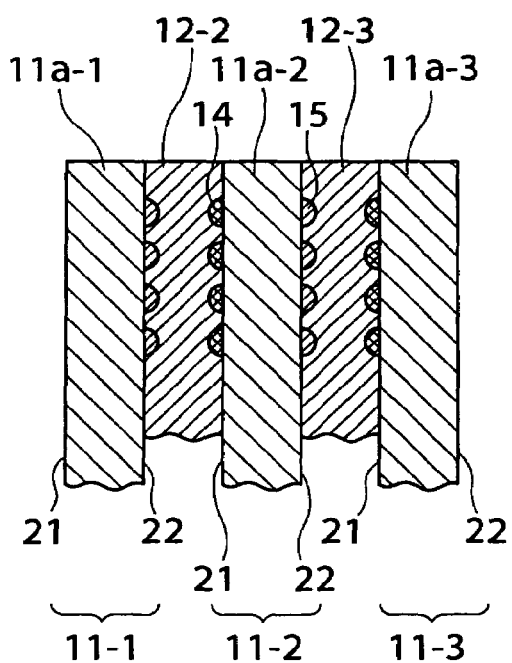

FIG. 3 is a perspective view showing the constitution of a fuel cell stack 10. In the figure, there are a plural number of membrane electrode assemblies 11-1, 11-2, and 11-3 (only one is shown in FIG. 3(a), and three are shown in FIG. 3(b)) having respectively solid polymer membranes 11a-1, 11a-2, 11a-3, each of them having on its one side a fuel electrode (anode) 21 and on its other side an oxidizer electrode (cathode) 22. The membrane electrode assemblies 11-1, 11-2, and 11-3 are separated from each other by means of separators 12-2 and 12-3 (only two are shown in FIGS. 3(a) and 3(b)). (In the following description, when the solid polymer membranes need not be referred to individually, only the symbol 11a is used, and likewise, the symbols 11 and 12 are used for the membrane electrode assemblies and the separators, respectively.) The surface on one side, on the fuel electrode side, of the separator 12 is provided with fuel gas passages 14, and the surface on the other side, on the oxidizer electrode side, of the separator 12 is provided with oxidizer gas passages 15, respectively in the form of fine grooves. The grooves forming the gas passages 14 and 15 respectively are formed to cover the entire surfaces on which they are formed. As described above, the fuel cell of the solid polymer type of this invention has a multilayer constitution, with the membrane electrode assembly 11 and the separator 12 arranged alternately.

When the separator 12 with its surface formed with the grooves is brought into tight, surface-to-surface contact with the solid polymer membrane 11, passages permitting the fuel gas to pass through, or the fuel gas passages 14, are formed by the grooves and the surface of the solid polymer membrane 11. The oxidizer gas passages 15 are formed likewise.

Here, the fuel electrode 21 and the oxidizer electrode 22 are a gas diffusion electrode made for example of a porous, electrically conductive material such as a carbon paper sheet in which catalyst such as platinum is retained. The membrane electrode assembly 11 is made by joining such a gas diffusion electrode to the solid polymer membrane 11*a*.

The separator 12 is made of an electrically conductive material such as carbon, and its both sides are provided with the fuel gas passages 14 and the oxidizer gas passages 15 formed by machining, pressing, or the like.

The solid polymer membrane 11*a* in the membrane electrode assembly 11 contains water content to form an electrolyte that permits selective permeation of ionized hydrogen. When fuel gas and oxidizer gas are supplied to the fuel cell, an electromotive force is generated between the fuel electrode 21 provided on the surface of the film 11*a* and the oxidizer electrode 22 provided on the other surface. When both of the electrodes are connected to an external load, hydrogen in the fuel gas is ionized on the fuel electrode as it releases electrons. The hydrogen ions permeate through the solid polymer membrane 11*a* and go onto the electrode 22 where the hydrogen ions react with electrons supplied from the electrode 22 and with oxygen $O_2$ contained in the oxidizer gas to produce water. At this time, an electric current flows through the external load.

While only the fuel gas passages 14 are shown in the perspective view because only one side of the separator 12 can be seen, the other, reverse side of the separator 12 is provided with the oxidizer gas passages 15 in approximately the same manner.

With the device having a constitution as described above, as electrons released from the fuel electrode are taken into the oxidizer electrode, a cell is constituted that has the fuel electrode 21 as the negative electrode and the oxidizer electrode 22 as the positive electrode. As a plural number of membrane electrode assemblies 11 (solid polymer membranes 11*a*) and separators 12 are placed alternately in a multilayer constitution, the whole arrangement constitutes a fuel cell producing an intended voltage.

In the solid polymer type fuel cell, water produced by the above-described electrochemical reaction at the oxidizer electrode 22 permeates through the solid polymer membrane 11*a*, and diffuses also on the side of the fuel electrode 21. To maintain the ion hydrogen permeability of the solid polymer membrane 11*a*, it is a common practice to humidify the supplied gasses so that they have appropriate water content. The water content in the cell is generally controlled to such an extent that it saturates at the cell operating temperature. Excessive water is carried to the respective gas passages and removed outward with gas that is left unused for the cell reaction.

However, in the operation at a low pressure, in particular in the operation at a low load with a slow gas flow velocity, water content may not be removed satisfactorily and may clog the gas passages. Since a cell with its passages clogged is not supplied with a sufficient amount of fuel gas or oxidizer gas, the voltage or output of the cell decreases. If such a situation is left as it is, there is a risk of corrosion of the cell constituting materials such as electrodes. Embodiments of this invention make it possible to prevent performance from decreasing as described above and to prevent materials from locally deteriorating.

Referring now to the flowchart shown in FIG. 1, the fuel cell generation system as the first embodiment is described. In the figure, a fuel gas feed pipe 31 is connected to a fuel gas inlet 13-1 (see FIG. 3) connected to the fuel electrode 21 of the fuel cell stack 10. A fuel gas blower is interposed in the middle of the fuel gas feed pipe 31. A fuel gas discharge pipe 32 is connected to a fuel gas outlet 13-3 (see FIG. 3).

Exactly in the same manner, an oxidizer gas (air) feed pipe 33 is connected to an oxidizer gas inlet 13-2 (see FIG. 3) connected to the oxidizer electrode 22. An air blower is interposed in the middle of the air feed pipe 33. An air discharge pipe 34 is connected to an air outlet 13-4 (see FIG. 3).

The fuel electrode 21 and the oxidizer electrode 22 are interconnected through a direct current circuit 41, in the middle of which is interposed a DC-AC converter 43. The DC-AC converter 43 is connected to an alternate current circuit 42. The direct current circuit 41 is provided with a current detector 51. However, the current detector may be provided in the alternate current circuit 42.

A flow rate controller 53 for controlling the flow rate of fuel gas 14*a* by regulating the rotation speed of the fuel gas blower 35 and a flow rate controller 54 for controlling the flow rate of air 15*a* by regulating the rotation speed of the air blower 36 are provided. The signal circuit of the current detector 51 is connected to the flow rate controllers 53 and 54.

The flow rate controllers 53 and 54 are to perform the process of calculating appropriate values of fuel flow rate and air flow rate according to the values of electric current, and to control the rotation speeds of the blowers 35 and 36 to produce such flow rates.

A second embodiment of the fuel cell generation system is described below in reference to the flowchart shown in FIG. 2. In this embodiment, pressurized fuel gas and pressurized air are supplied, different from the first embodiment.

A pressurized fuel gas feed pipe 31 is provided with a control valve 37 at a position on the upstream side of the fuel cell stack 10 and with a fuel gas flow rate detector 61 at a position between the control valve 37 and the fuel cell stack 10. Likewise, a pressurized air feed pipe 33 is provided with a control valve 38 and an air flow rate detector 62.

While it is assumed here that pressurized gas and pressurized air are supplied, it may be otherwise assumed that the fuel gas supplied has a low pressure insufficient for use in the fuel cell stack 10 and that the fuel gas feed pipe 31 is provided with a fuel gas blower 35 (not shown) at a position on the upstream side of the fuel gas control valve 37. Likewise, in case the pressure of the supplied air is insufficient or too low for use in the fuel cell stack 10, the air feed pipe 33 may be provided with an air blower 36 (not shown) at a position on the upstream side of the control valve 38.

The control with this embodiment is carried out such that the calculation process controller 63 calculates a required fuel flow rate according to the current value detected with the current detector 51 and that the control valve 37 is opened or closed so that the flow rate detected with the flow rate detector 61 matches the flow rate calculated as described above. In other words, the setting value of the flow rate control is determined by the calculated result with the current detector 51 and the calculation process controller 63, and the calculation process controller 63 performs control according to the setting value. This is the so-called cascade control. In this way, which is different from that of the first embodiment, the fuel flow rate can be controlled more accurately to an intended value. This is exactly true also for air.

It is also possible to provide flow rate detectors 61 and 62 in the first embodiment to control the rotation speed of the blowers. In this way, control of the fuel flow rate or air flow rate can be carried out in the first embodiment with the same accuracy as in the second embodiment.

Next, the function of the fuel cell generation system of the embodiments shown in FIGS. 1 and 2 is described in reference to the graphs of FIGS. 4, 5, 6, and 7. The direct current generated is detected with the current detector 51, and the controller (calculation process controller) 53 controls the rotation speed of the blower 35 so that fuel is supplied at a flow rate calculated from the detected current value. In the same manner, the rotation speed of the blower 36 is controlled to supply air at a flow rate calculated from the detected current value.

Figure 4:
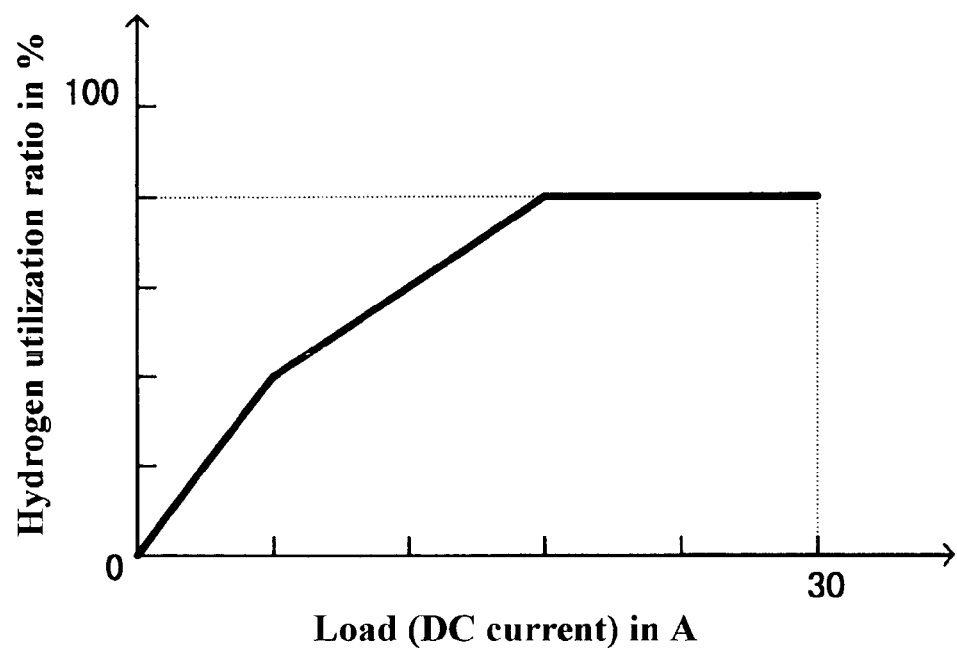
FIG. 4 is a graph showing relation between load and hydrogen utilization ratio in the generation method using the fuel cell generation system according to an embodiment of this invention.
Figure 6:
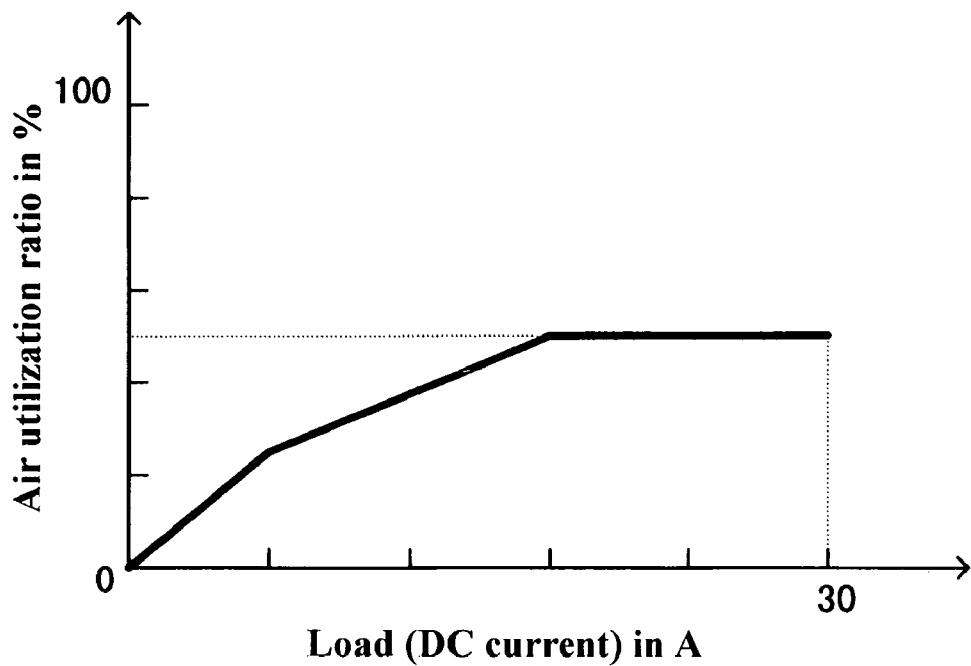
FIG. 6 is a graph showing relation between load and air utilization ratio in the generation method using the fuel cell generation system according to the embodiment of this invention.

At this time, as shown in the graph of load versus hydrogen utilization ratio of FIG. 4 and in the graph of load versus air utilization ratio of FIG. 6, the feed rates of both gasses are set so that one or both of the utilization ratios of hydrogen (fuel gas) and air (oxidizer gas) are low when output is low and are high when output is near the rated operation point.

The hydrogen utilization ratio is made constant when the load is between 100% and 40 to 75%. The hydrogen utilization ratio at this time is 60 to 90%, preferably 70 to 80%. When the load is in the range between 10 to 50% and 0%, the fuel flow rate is made constant. The fuel flow rate at this time is 20 to 60% of the rated value, preferably 30 to 40%. The utilization ratio at this time is 0 to 60%, preferably 0 to 40%.

The utilization ratio of air, oxidizer gas, is made constant when the load is between 100% and 40 to 75%. The utilization ratio at this time is 30 to 60%, preferably 40 to 55%, more preferably 45 to 50%. When the load is in the range between 10 to 50% and 0%, the air flow rate is made constant. The flow rate at this time is 20 to 60% of the rated value, preferably 25 to 50%, more preferably 30 to 40%. The utilization ratio at this time is 0 to 40%, preferably 0 to 25%.

Figure 5:
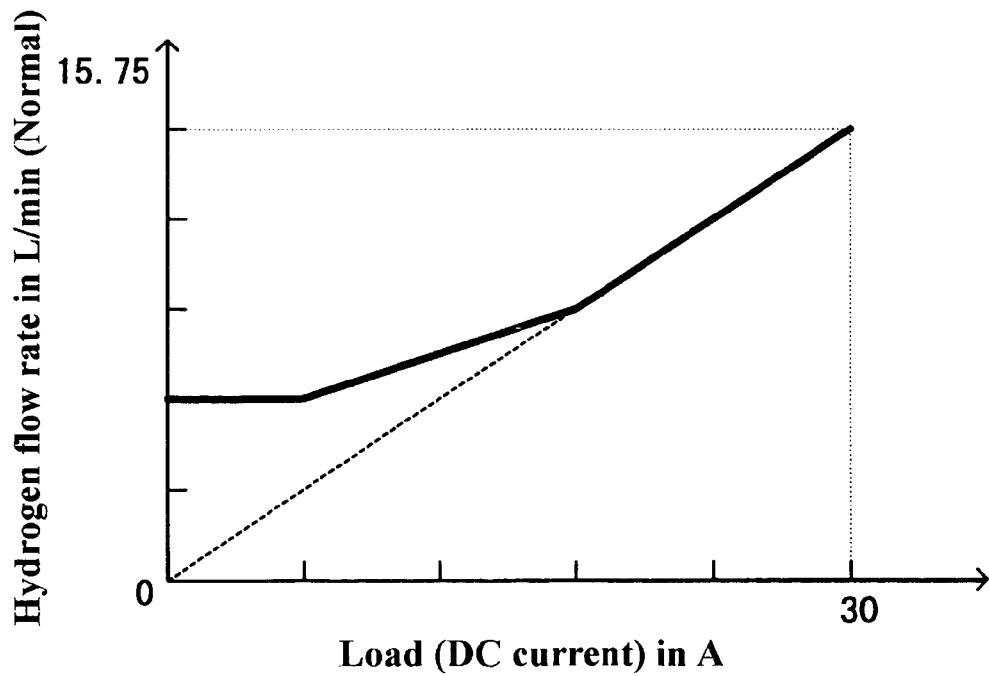
FIG. 5 is a graph showing relation between load and hydrogen flow rate in the generation method using the fuel cell generation system according to the embodiment of this invention.
Figure 7:
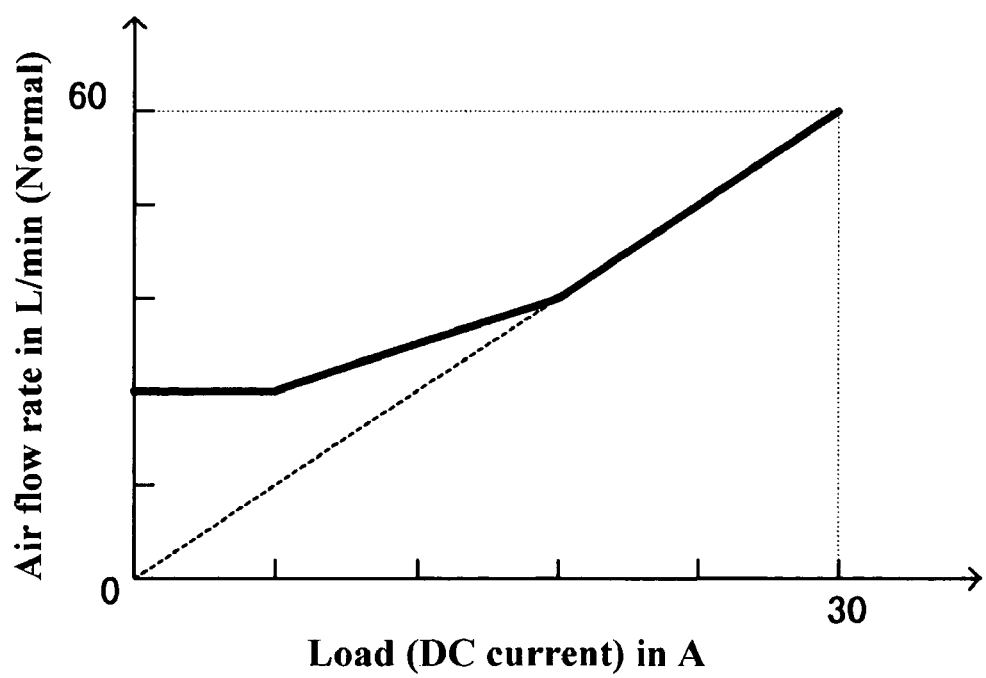
FIG. 7 is a graph showing relation between load and air flow rate in the generation method using the fuel cell generation system according to the embodiment of this invention.

It may also be arranged that one or both of the fuel flow rate and the oxidizer gas flow rate are given minimum values, as shown in the graph of load versus hydrogen flow rate of FIG. 5 and the graph of load versus air flow rate of FIG. 7, so that the calculation process controller perform control such that one or both of the fuel flow rate and the oxidizer gas flow rate do not decrease but remain constant even when output decreases in the low load operation.

Also as shown in the graphs of the fuel utilization ratio and the oxidizer utilization ratio of FIGS. 4 and 6, a range in which the gradient of the curve is less steep than in the low output range may be interposed between the low output range and the high output range where the curve is flat with the hydrogen utilization ratio or the oxidizer utilization ratio being constant.

The above corresponds to the fact that the graphs of load versus flow rate of FIGS. 5 and 7 have a range where the gradient of the hydrogen flow rate is gentle between the high output range where the gradient of the hydrogen flow rate is constant and the low output range where the hydrogen flow rate is constant. The same applies to the air flow rate.

The control described above may be arranged that a curve of load versus hydrogen utilization ratio of FIG. 4 is preset and stored in advance in a memory of the calculation process controller to calculate the hydrogen utilization ratio according to the detected current value, or that a curve of load versus hydrogen flow rate of FIG. 5 is preset to calculate the hydrogen flow rate according to the current value detected in the same manner. As for air, the curve of FIG. 6 or 7 may be preset to perform calculations in the same manner.

As described above, the embodiment of this invention is characterized in that one or both of the fuel gas utilization ratio and the oxidizer gas utilization ratio preset as target values are set to be low when output is low and to be high in the vicinity of the rated operation point. Depending on situations, one or both of the fuel flow rate and the oxidizer gas flow rate are given minimum values, and respective target values are set so that the one or both of fuel and oxidizer do not decrease and remain constant even when output decreases.

When the control is carried out as described above, the fuel flow rate is prevented from decreasing extremely even at a low load, and the problems, described in reference to FIG. 3, of the fuel gas passages 14 or the oxidizer gas passages 15 being clogged with water condensed in these gas passages, are avoided. Therefore, the cell can be prevented from being damaged as a result of the gas passages being clogged.

As the range of gas flow rate to be controlled with the blower does not become too wide, design and operation of related devices are made easy.

The embodiment of this invention as described above makes it possible to secure stability in the low output operation by appropriately controlling the utilization ratios of gasses supplied to the fuel cell, and to provide a fuel cell generation system capable of operating in a wider range. This is achieved by controlling one or both of the fuel utilization ratio and the oxidizer utilization ratio in the low load operation to be low in comparison with those in the rated operation. When the above means is put to practical use, one or both of the flow rate of fuel and oxidizer are given minimum values in the low load operation, so that the supply flow rate is made constant even when output decreases, making it possible to restrict the turn-down ratios of the feed blower and the flow rate control device and to reduce the costs of such devices.

A specific example is described below. This example of the solid polymer type fuel cell generation system is set with the number of laminated cell layers being 60 and the rated operation point being set with 30 A and 1.25 kW DC. Consumed amounts of fuel (hydrogen here) and oxidizer gas (air here) are determined from the measured direct current values as follows in consideration of stoichiometric ratios:

$$\text{Consumed hydrogen amount(NL/min)} = \text{Current value}(A) \times 22.4 \text{ NL/mol} \times 60 (\text{sec/min}) \times \text{number of cells}/(2 \times 96500 \text{ (C/mol)})$$

$$\text{Consumed air amount(NL/min)} = \text{Current value}(A) \times 22.4 \text{ NL/mol} \times 60 \text{ (sec/min)} \times \text{number of cells}/(4 \times 96500 \text{ (C/mol)} \times 0.21)$$

Here, the volume of ideal gas under standard conditions is indicated to be 22.4 L/mol and the volume converted to standard conditions is represented with NL. The Faraday constant is indicated to be 96500 (C/mol) and the oxygen concentration in air to be 21%. Therefore, when the number of cells is 60, the consumed amounts of hydrogen and air are calculated as follows:

$$\text{Consumed hydrogen amount} = \text{Current value}(A) \times 0.418 \text{ (NL/min }A)$$

$$\text{Consumed air amount} = \text{Current value}(A) \times 1.00 \text{ (NL/min }A)$$

This example is characterized by setting the utilization ratios of fuel and air to low values in the low load range, and the utilization ratios and gas flow rates of hydrogen and air are set as follows for each load range, for example.

a) 0-20% (0-6 A)

Input hydrogen amount=6.3 L/min (Normal), constant. Utilization ratio=0-40%

Input air amount=24 L/min (Normal), constant. Utilization ratio=0-25% b) 20-60% (6-18 A)

Input hydrogen amount=Current value (A)×0.2625+4.725 (L/min (Normal)).

Utilization ratio=40-80%

Input air amount=Current value (A)×1.00+18.0 (L/min (Normal)).

Utilization ratio=25-50% c) 60-100% (18-30 A)
Input hydrogen amount=Current value(A)×0.525 (L/min (Normal)).
Utilization ratio=80%
Input air amount=Current value (A)×2.00 (L/min (Normal)) (L/min (Normal)).
Utilization ratio=50%

Preset utilization ratio values of hydrogen and air for each load range are shown in FIGS. 4 and 6. Preset flow rate values of hydrogen and air for each load range are shown in FIGS. 5 and 7.

Two examples are considered to be put to practical use. First, in the case the system is constituted as shown in FIG. 1, a table of relation between the blower rotation speed and the supplied gas flow rate is prepared in advance and the blowers are controlled to supply the amounts of hydrogen and air preset as described above for every load current value.

Figure 8:
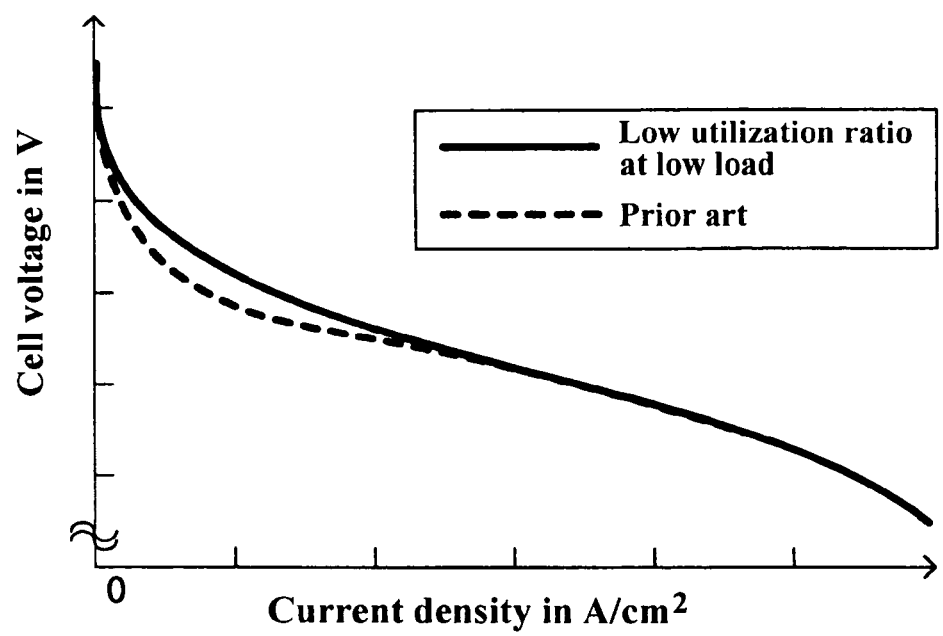
FIG. 8 is a graph for describing relation between current density and cell voltage, for both prior art and the embodiment of this invention.
Figure 9:
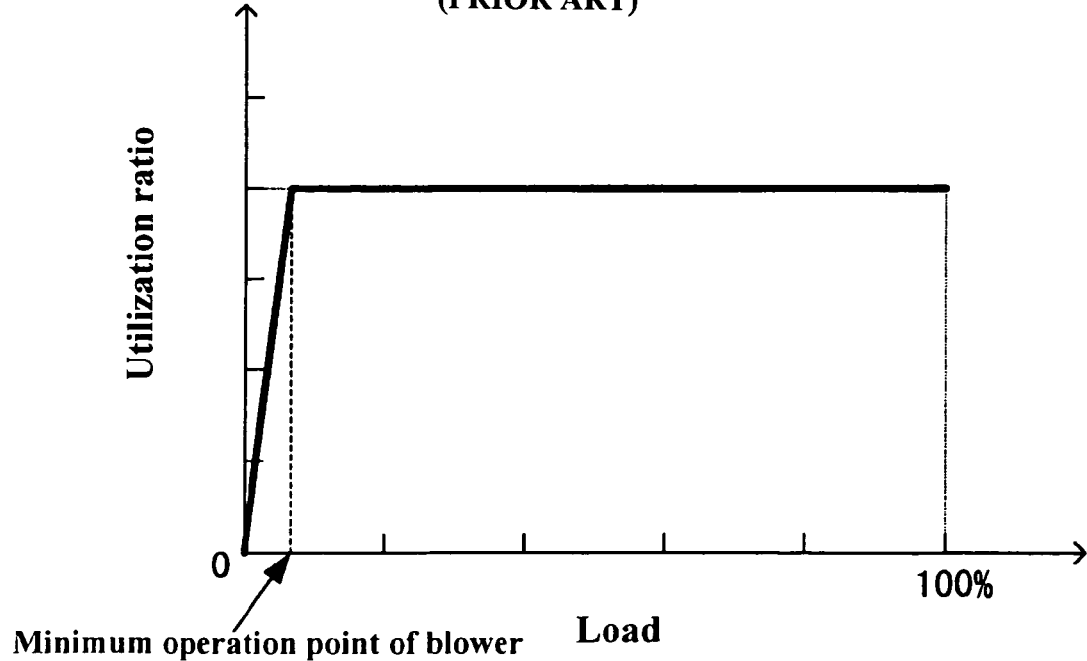
FIG. 9 is a graph showing relation between load and gas utilization ratio in the generation method using a conventional fuel cell generation system.
Figure 10:
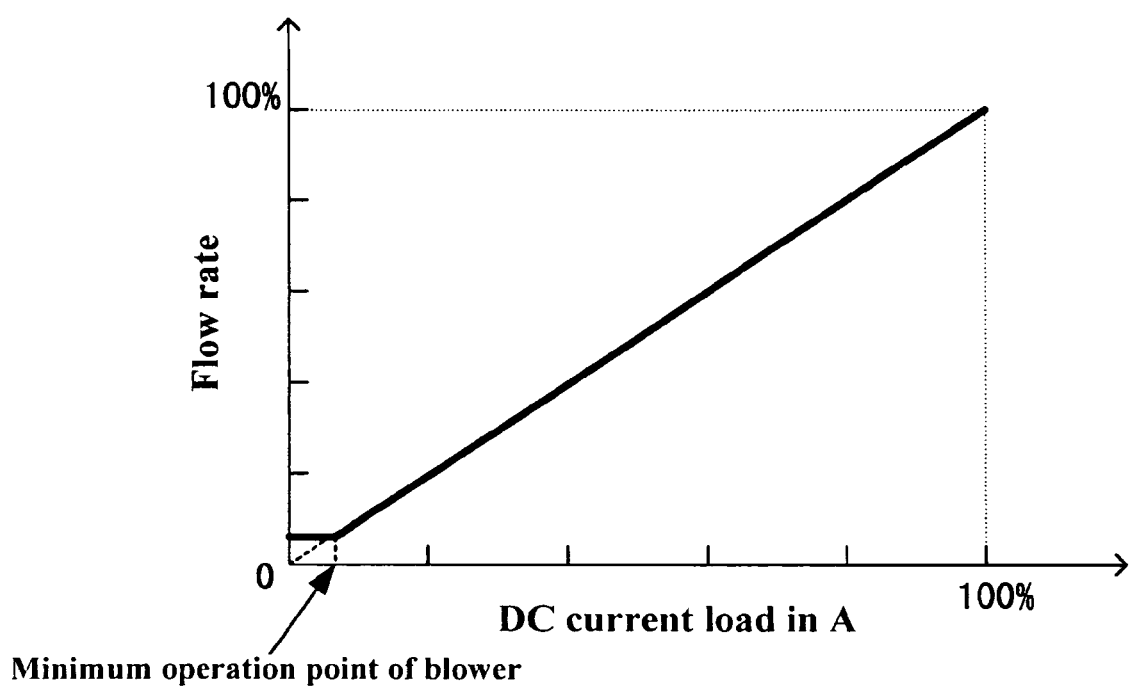
FIG. 10 is a graph showing relation between load and gas flow rate in the generation method using a conventional fuel cell generation system.

Referring to the graph shown in FIG. 8, the relation between the current density value and the cell voltage is described. In the figure, the curve in broken line shows the change in the cell voltage according to the prior art, and the curve in solid line shows the change in the cell voltage according to the embodiment of this invention. As shown in the figure, with the embodiment of this invention, since the fuel utilization ratio or the air utilization ratio in the low load range is low in comparison with that by the prior art, the cell voltage in the low load range is higher than that by the prior art.

In the case the system is constituted as shown in FIG. 2, the control is carried out either such that flow rates of both gasses are regulated, or such that the output current is regulated by a load command to the DC-AC converter, so that the hydrogen utilization ratio, or the air utilization ratio, calculated from the load current value and the hydrogen supply rate, or the air supply rate, becomes equal to the preset value of the hydrogen utilization ratio, or the air utilization ratio, determined according to the respective load current values as described above. In this way, a system is realized that achieves lower fuel or air utilization ratio in the low output range than in the rated operation range, which is characterized by this invention.

As described above, it is possible to provide a solid polymer type fuel cell generation system of the so-called non-pressurized type in which fuel gas and oxidizer gas are fed at low pressures (typically at 0.1 MPa or less) and to provide a generation method using that system, in which gas is diffused evenly by lowering one or both of the fuel utilization ratio and the oxidizer utilization ratio in the low load operation, the cell is prevented from being damaged by preventing flow passages from being clogged with condensed water, and stabilized low load operation is realized over a wide range of operation. At the same time, degree of freedom in choosing auxiliary components for the generation system is increased and the cost can be reduced by reducing the turn-down ratio required of the component devices.

INDUSTRIAL APPLICABILITY

According to this invention described above, it is possible to provide a generation method using a fuel cell generation system, that is easy to use for example in household because a fuel gas containing hydrogen as a main component is supplied at a low pressure to a fuel electrode through gas passages while an oxidizer gas is supplied at a low pressure to an oxidizer electrode, that can generate electricity by causing the supplied fuel gas and the supplied oxidizer gas to react electrochemically with each other, and that prevents performance from lowering and materials from locally deteriorating because the fuel utilization ratio on the fuel electrode is controlled so as to prevent fuel gas passages from being clogged with condensed water.

It is also possible to provide a fuel cell generation system, that is easy to use for example in household because a fuel gas is supplied at a low pressure to gas passages while an oxidizer gas is supplied at a low pressure to an oxidizer electrode, that can generate electricity by causing the supplied fuel gas and the supplied oxidizer gas to react electrochemically with each other, and that prevents performance from lowering and materials from deteriorating because a controller is provided that controls the fuel utilization ratio on the fuel electrode so as to prevent fuel gas passages from being clogged with condensed water.

The invention claimed is:

1. A generation method using a fuel cell generation system having a solid polymer membrane forming an electrolyte, having a fuel electrode and fuel gas passages for supplying to the fuel electrode a fuel gas containing hydrogen as a main component on one side of the solid polymer membrane, and having an oxidizer electrode on the other side of the solid polymer membrane, the method comprising the steps of:
   supplying the fuel gas to the fuel electrode through the fuel gas passages at a low pressure;
   supplying an oxidizer gas to the oxidizer electrode at a low pressure;
   generating electricity by causing electrochemical reaction between the fuel gas and the oxidizer gas supplied; and
   controlling a fuel utilization ratio on the fuel electrode so as to prevent the fuel gas passages from being clogged with condensed water,
   wherein a target value is preset for the fuel utilization ratio in the controlling step, to a low value when an output of the fuel cell generation system is low and to a high value in the vicinity of a rated operation point, and wherein the fuel utilization ratio is a ratio of an amount of gas actually consumed for the reaction to an amount of gas supplied for the reaction.

2. The generation method using a fuel cell generation system as recited in claim 1, wherein a minimum value is given for the fuel gas flow rate in the controlling step, and a target utilization ratio is set so that the fuel gas flow rate does not decrease to below the minimum value but remains constant even when the output of the fuel cell generation system decreases.

3. A generation method using a fuel cell generation system having a solid polymer membrane forming an electrolyte, having a fuel electrode on one side of the solid polymer membrane, and having an oxidizer electrode and oxidizer gas passages for supplying an oxidizer gas to the oxidizer electrode on the other side of the solid polymer membrane, the method comprising the steps of:
   supplying a fuel gas containing hydrogen as a main component to the fuel electrode at a low pressure;
   supplying the oxidizer gas to the oxidizer electrode through the oxidizer gas passages at a low pressure;
   generating electricity by causing electrochemical reaction between the fuel gas and the oxidizer gas supplied; and
   controlling an oxidizer utilization ratio on the oxidizer electrode so as to prevent the oxidizer gas passages from being clogged with condensed water,
   wherein a target value is preset for the oxidizer utilization ratio in the controlling step, to a low value when an output of the fuel cell generation system is low and to a high value in the vicinity of a rated operation point, and wherein the oxidizer utilization ratio is a ratio of an amount of gas actually consumed for the reaction to an amount of gas supplied for the reaction.

4. The generation method using a fuel cell generation system as recited in claim 3, wherein a minimum value is given for the oxidizer gas flow rate in the controlling step, and a target utilization ratio is set so that the oxidizer gas flow rate does not decrease to below the minimum value but remains constant even when the output of the fuel cell generation system decreases.

5. A fuel cell generation system comprising:
a solid polymer membrane forming an electrolyte;
a fuel electrode provided on one side of the solid polymer membrane;
fuel gas passages provided adjacent to the fuel electrode, the fuel cell generation system being adapted to supply a fuel gas containing hydrogen as a main component to the fuel electrode at a low pressure through the fuel gas passages;
an oxidizer electrode, provided on the other side of the solid polymer membrane, the fuel cell generation system being adapted to supply the oxidizer electrode with an oxidizer gas at a low pressure; and
a first controller adapted to control a fuel utilization ratio on the fuel electrode so that the fuel gas passages are not clogged with water,
wherein electricity is generated by causing electrochemical reaction between the fuel gas and the oxidizer gas supplied, and
wherein the first controller is adapted to preset a target value for the fuel utilization ratio, the target value being set to be low when the output of the fuel cell generation system is low and to be high in the vicinity of a rated operation point, and wherein the fuel utilization ratio is a ratio of an amount of gas actually consumed for the reaction to an amount of gas supplied for the reaction.

6. The fuel cell generation system as recited in claim 5, wherein the first controller is adapted to give a minimum value for the fuel gas flow rate and set a target utilization ratio so that the flow rate of the fuel gas does not decrease to below the minimum value but remains constant even when the output of the fuel cell generation system decreases.

7. A fuel cell generation system comprising:
a solid polymer membrane forming an electrolyte;
a fuel electrode provided on one side of the solid polymer membrane, the fuel cell generation system being adapted to supply the fuel electrode with a fuel gas containing hydrogen as a main component at a low pressure;
an oxidizer electrode provided on the other side of the solid polymer membrane;
oxidizer gas passages provided adjacent to the oxidizer electrode, the fuel cell generation system being adapted to supply an oxidizer gas to the oxidizer electrode at a low pressure through the oxidizer gas passages; and
a second controller adapted to control an oxidizer utilization ratio on the oxidizer electrode so that the oxidizer gas passages are not clogged with water,
wherein electricity is generated by causing electrochemical reaction between the fuel gas and the oxidizer gas supplied, and
wherein the second controller is adapted to preset a target value for the oxidizer utilization ratio, the target value being set to be low when the output of the fuel cell generation system is low and to be high in the vicinity of a rated operation point, and wherein the oxidizer utilization ratio is a ratio of an amount of gas actually consumed for the reaction to an amount of gas supplied for the reaction.

8. The fuel cell generation system as recited in claim 7, wherein the controller is adapted to give a minimum value for the flow rate of the oxidizer gas, and set a target utilization ratio so that the flow rate of the oxidizer gas does not decrease to below the minimum value but remains constant even when the output of the fuel cell generation system decreases.

* * * * *